United States Patent
Koster (10) Patent No.: US 11,182,350 B2
(45) Date of Patent: *Nov. 23, 2021

(54) INTELLIGENT XML FILE FRAGMENTATION

(71) Applicant: International Business Machines Corporation, Armonk, NY (US)

(72) Inventor: David M. Koster, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1829 days.

This patent is subject to a terminal disclaimer.

(21) Appl. No.: 14/564,432

(22) Filed: Dec. 9, 2014

(65) Prior Publication Data

US 2016/0162563 A1    Jun. 9, 2016

(51) Int. Cl.
*G06F 16/182* (2019.01)
*G06F 16/84* (2019.01)
*G06F 16/835* (2019.01)

(52) U.S. Cl.
CPC .......... *G06F 16/182* (2019.01); *G06F 16/835* (2019.01); *G06F 16/84* (2019.01)

(58) Field of Classification Search
None
See application file for complete search history.

(56) References Cited

U.S. PATENT DOCUMENTS

| 8,190,659 | B2 * | 5/2012 | Holm | G06Q 10/10 |
| | | | | 707/828 |
| 2003/0023590 | A1 | 1/2003 | Atkin | |
| 2003/0069881 | A1 * | 4/2003 | Huttunen | G06F 17/30896 |
| 2004/0073541 | A1 * | 4/2004 | Lindblad | G06F 17/30911 |
| 2005/0091188 | A1 * | 4/2005 | Pal | G06F 17/30911 |
| 2008/0040498 | A1 | 2/2008 | Setlur et al. | |
| 2011/0137921 | A1 | 6/2011 | Inagaki | |
| 2013/0311481 | A1 | 11/2013 | Bhatt et al. | |
| 2015/0052109 | A1 * | 2/2015 | Word | G06F 17/30221 |
| | | | | 707/651 |

OTHER PUBLICATIONS

Da Silva et al., "Towards Recommendations for Horizontal XMLFragmentation", Journal of Information and Data Management, vol. 4, No. 1, Feb. 2013.
Schroeder et al., "Affinity-based XML Fragmentation", Fifteenth International Workshop on the Web and Databases (WebDB 2012), May 20, 2012.
Koster, David M., "Intelligent XML File Fragmentation" U.S. Appl. No. 14/571,208, filed Dec. 15, 2014.
List of IBM Patents or Patent Applications Treated As Related.

* cited by examiner

*Primary Examiner* — Amresh Singh
(74) *Attorney, Agent, or Firm* — L. Jeffrey Kelly (57) ABSTRACT

An XML fragmenting mechanism uses an XML schema for the XML file to split up the XML file in a hierarchal structure of data blocks for storage in a storage system with a limited block size such as a cluster coordination service. The XML fragmenting mechanism creates an XML file map to document the structure of the XML file in the storage system. The XML fragmenting mechanism stores the data blocks in the storage system according to the XML file map and supports retrieval of all or part of the data in a format that supports XML validation.

9 Claims, 7 Drawing Sheets

<?xml version = "1.0" encoding = "UTF 8"?>Example

312
```
<Parent name = "A">
  <Child name = "1">Data</Child>
  <Child name = "2">Data</Child>
</Parent>
<Parent name = "B">
<Child name = "1">Data</Child>
</Parent>
<Parent name = "C"/>
```

```
<xs:schema attributeFormDefault="unqualified" elementFormDefault="qualified"
      xmlns:xs="http://www.w3.org/2001/XMLSchema">
  <xs:element name="Document">
    <xs:complexType>
      <xs:sequence>
        <xs:element name="Parent" maxOccurs="unbounded" minOccurs="0">
          <xs:complexType mixed="true">
            <xs:sequence>
              <xs:element name="Child" maxOccurs="unbounded" minOccurs="0">
                <xs:complexType>
                  <xs:simpleContent>
                    <xs:extension base="xs:string">
                      <xs:attribute type="xs:byte" name="name" use="optional"/>
                    </xs:extension>
                  </xs:simpleContent>
                </xs:complexType>
              </xs:element>
            </xs:sequence>
            <xs:attribute type="xs:string" name="name" use="optional"/>
          </xs:complexType>
        </xs:element>
      </xs:sequence>
    </xs:complexType>
  </xs:element>
</xs:schema>
```

INTELLIGENT XML FILE FRAGMENTATION

BACKGROUND

1. Technical Field

This invention generally relates to computer data systems, and more specifically relates to intelligent XML file fragmentation for storage of the XML file in a storage system with a limited data block size such as a cluster coordination service.

2. Background Art

A cluster coordination service is used to provide configuration and coordination of group services across a cluster of nodes in a computer data system. The group services are sometimes used by distributed applications. Cluster coordination services are typically not intended to provide data storage and distribution services. As a consequence, data services such as the cluster coordination service provide a limited data storage service. Thus a cluster coordination service usually has a small maximum block size for data stored in the service, which is typically 1 megabyte.

Streaming applications can have immensely large numbers of processing nodes each of which is configured to perform a specific task. A cluster coordination service is used to configure and coordinate the services of the processing nodes of the streaming application. A streaming application may generate a single XML file or package for configuration and deployment of streaming applications. This XML file may be larger than the maximum block size for some storage requirements. For example, an XML file may exceed the maximum block size of a cluster coordination service. Further, it is sometimes advantageous to retrieve a portion of the XML file.

BRIEF SUMMARY

An XML fragmenting mechanism uses an XML schema for an XML file to split up the XML file in a hierarchal structure of data blocks for storage in a storage system with a limited block size such as a cluster coordination service. The XML fragmenting mechanism creates an XML file map to document the structure of the XML file in the storage system. The XML fragmenting mechanism stores the data blocks in the storage system according to the XML file map and supports retrieval of all or part of the data in a format that supports XML validation.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and.

DETAILED DESCRIPTION

The disclosure and claims herein relate to fragmenting an XML file for storage in a storage system with a limited block size such as a cluster coordination service. An XML fragmenting mechanism uses an XML schema for the XML file to split up the XML file in a hierarchal structure of data blocks for storage. The XML fragmenting mechanism creates an XML file map to document the structure of the XML file in the storage system. The XML fragmenting mechanism stores the data in the storage system according to the XML file map and supports retrieval of all or part of the data in a format that supports XML validation.

Figure 1:
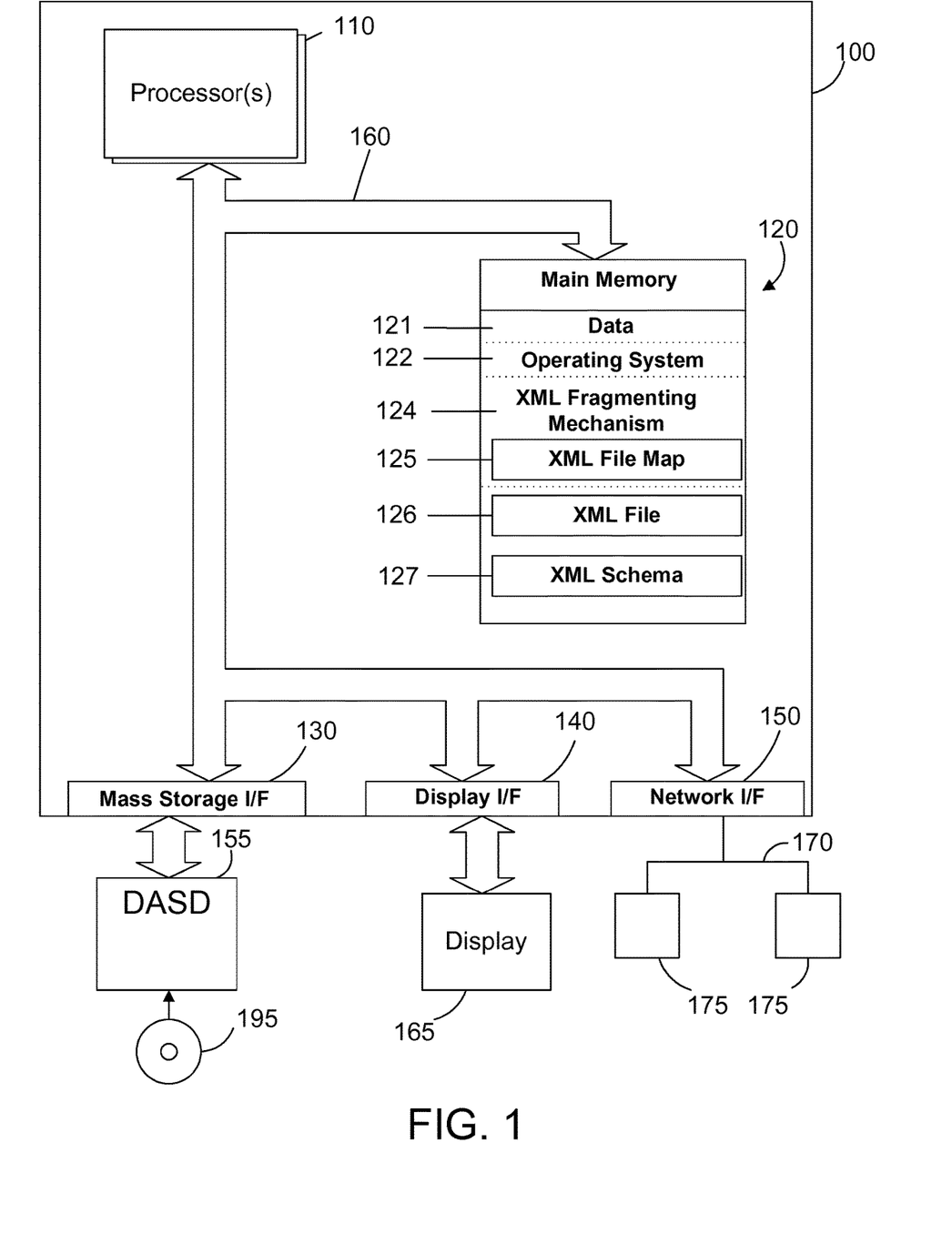
FIG. 1 illustrates a block diagram of a computer system apparatus with an XML fragmenting mechanism as described herein.

Referring now to FIG. 1, a computer system 100 is one suitable implementation of an apparatus in accordance with the preferred embodiments of the invention. Computer system 100 represents a computer system such as a Power System by International Business Machines Corporation (IBM). However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices such as a direct access storage device (DASD) 155 to computer system 100. One specific type of direct access storage device 155 is a readable and writable CD RW drive, which may store data to and read data from a CD 195. Alternatively, the DASD may be a storage device such as a magnetic disk drive or a solid state disk drive.

Main memory 120 in accordance with the preferred embodiments contains data 121, and an operating system 122. Data 121 represents any data that serves as input to or output from any program in computer system 100. Operating system 122 represents an appropriate multitasking operating system known in the industry such as "IBM i", AIX (Advanced Interactive eXecutive) or Linux; however, those skilled in the art will appreciate that the spirit and scope of the present invention is not limited to any one operating system. The main memory 120 also includes an XML fragmenting mechanism 124 with an XML file map 125, an XML file 126 and an XML schema 127.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, XML fragmenting mechanism 124, XML file map 125, XML file 126 and XML schema 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the XML fragmenting mechanism 124 may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Figure 2:
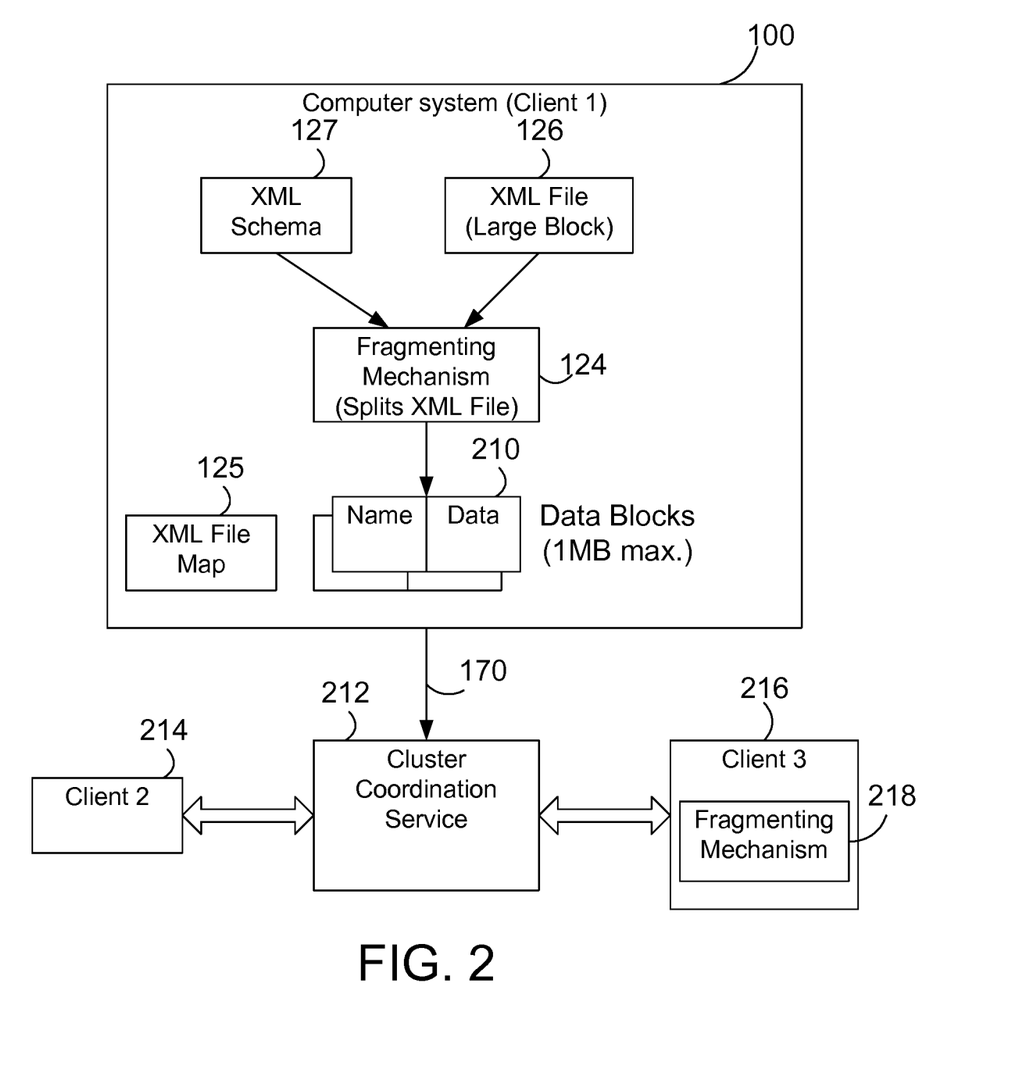
FIG. 2 illustrates a block diagram that shows the operation of the XML fragmenting mechanism fragmenting an XML file for storage in a cluster coordination service.

FIG. 2 illustrates a block diagram to show the operation of the XML fragmenting mechanism fragmenting an XML file for storage in a storage system such as cluster coordination service 212. The cluster coordination service 212 provides services for multiple clients. In the illustrated example, the cluster coordination service 212 is connected to the example computer system 100 shown in FIG. 1, where computer system 100 is shown in this example as client 1. The cluster coordination service 212 is also connected to client 2 214 and client 3 216. The client computer systems may be connected to the cluster coordination service 212 in a similar manner as known in the prior. The computer system 100 includes a fragmenting mechanism 124 as introduced in FIG. 1. The XML fragmenting mechanism 124 splits the XML file 126 that comprises a single large block of data using a corresponding XML schema 127. The XML fragmenting mechanism 124 produces multiple blocks 210 that contain the data from the XML file 126. The data blocks 210 each have a name and an amount of data that does not exceed the maximum size constraint of the cluster coordination service (typically 1 mega byte). The XML fragmenting mechanism further produces an XML file map 125 that is used to retrieve the data as described further below. The XML file map 125 is preferably stored in the cluster coordination service but may be stored elsewhere. The XML fragmenting mechanism 124 could be implemented as an Application Programing Interface (API) or any other software architecture to split and store portions of an XML file as described herein.

A binary writable schema is a schema that specifies how the data will be laid out when serialized to a binary (versus text like XML) format to achieve maximum compactness. To split or fragment the XML file as introduce above, the XML fragmenting mechanism 124 generates or obtains a binary writeable schema that matches the XML. The schema may be generated with prior art software techniques. When the binary writable schema is generated, all required sub-objects are removed from the XML schema file and made optional. This allows the storage of the sub-objects in another place without breaking validation rules of the XML file. The XML fragmenting mechanism then generates mapping rules. The mapping rules describe the relationship between the XML data and the file map. The mapping rules use the XML parent-child relationship as defined in the schema to make a comparable folder-file relationship within the map. Thus when a block is processed the mapping rules produce a corresponding location(s) for the primary object and any sub-objects.

While splitting the XML file, the XML fragmenting mechanism 124 creates an XML file map 125 that specifies the storage locations of sub-objects in a hierarchical structure. The objects of the fragmented XML file are stored in a hierarchical manner in a data structure such as a cluster coordination service where the child objects are stored underneath their parent object. To create the XML file map 125, the XML fragmenting mechanism translates parent/child relationships from the XML file schema to a file system layout to specify a location for storage of the data blocks. Then the parent/child XML data blocks are validated by making sure each of the XML blocks are valid on their own so that they can be returned individually and meet XML validation requirements. Validation of XML is defined by the XML specification. Typically 3rd party packages are used to write XML and they have their own validation logic that checks conformity with the XML specification. In a similar fashion the XML fragmenting mechanism insures the XML data blocks returned are valid to XML requirements.

The XML fragmenting mechanism 124 uses the XML file map 125 to store the XML file (126 in FIG. 1) in a data structure such as a cluster coordination service 212 (FIG. 2). First, the XML fragmenting mechanism assigns XML content to binary writable blocks. The XML fragmenting mechanism then moves child and sub-objects data to binary writable blocks and then outputs the binary writable blocks (sometimes referred to as modules). The XML fragmenting mechanism then outputs the binary writable blocks having a name and data portion to the storage structure. The binary writable blocks are a subset of the XML file that conform to XML validation rules and written in a binary writable format to be stored in the data structure (cluster coordination service).

Once the XML file data has been fragmented and stored, the data must be extracted from the coordination service to be used. Since the data is stored in a hierarchal structure, any portion of the data can be retrieved by the XML fragmenting mechanism. In the describe example herein, the XML fragmenting mechanism requests the map from the cluster coordination service. The desired entry is found in the map and then the desired entry is requested from the cluster coordination service using the location found in the map. The XML fragmenting mechanism is then able to output a valid XML file. As described herein, it is possible to retrieve a limited subset of the XML file rather than retrieving the entire XML file to more efficiently use the XLM file. The XML fragmenting mechanism 124 may retrieve and assemble the smallest portion of the XML file that can be made to pass validation and contains the desired portion of the XML file. The XML fragmenting mechanism that retrieves the data may be the same fragmenting mechanism that stored it, or it may be another fragmenting mechanism 218 in another client such Client 3 216 as shown in FIG. 2.

FIGS. 3-6 illustrate an example of intelligent fragmenting of an XML file. FIG. 3A illustrates a simplified XML file 300 that will be used to show an example of fragmenting an XML file by the XML fragmenting mechanism. The XML file 300 has a header 310 that indicates the name of the file is "Example". The XML file 300 further has a body 312 that has 3 data structures or elements named Parent "A", Parent "B" and Parent "C". Parent A has two "child" data elements named Child "1" and Child "2". Parent B has one "child" data element named Child "1". Parent "C" has no child elements.

Figure 3A:
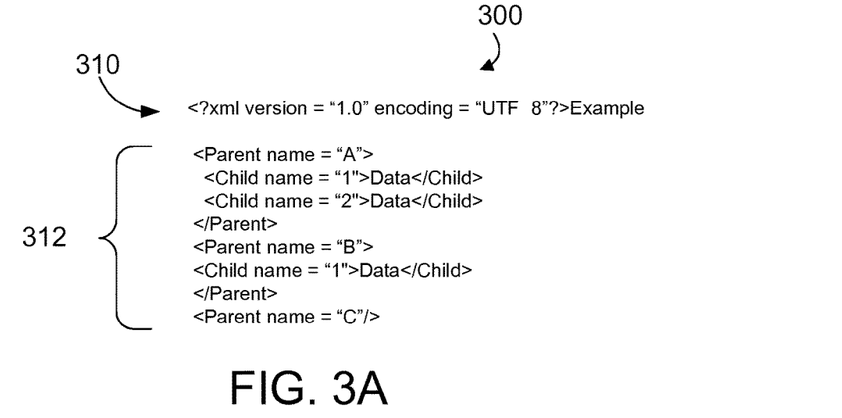
FIG. 3A illustrates a simplified XML file to show an example of fragmenting an XML file by the XML fragmenting mechanism.
Figure 3B:
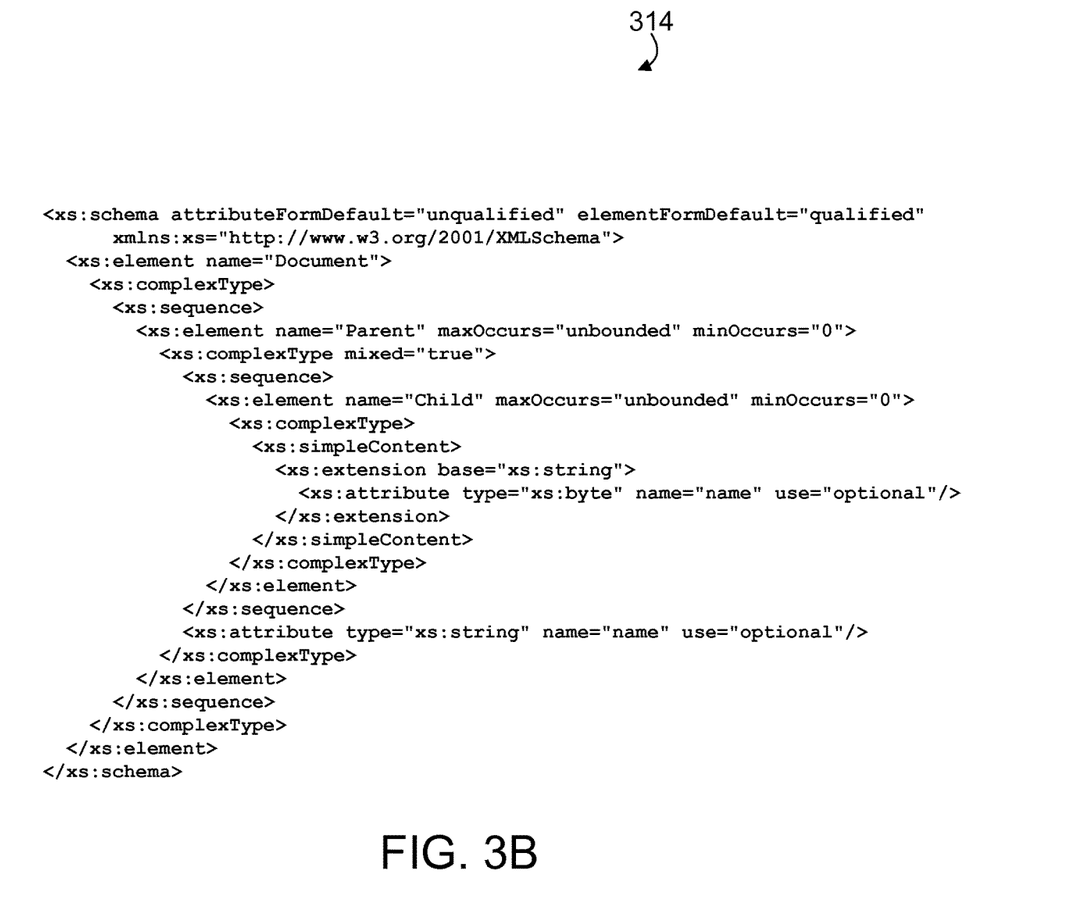
FIG. 3B illustrates an XML schema file for the simplified XML file shown in FIG. 3A.

FIG. 3B illustrates an XML schema definitions (XSD) file corresponding to the XML file shown in FIG. 3A. The XML schema specifies restrictions in the data format of the XML file. This XSD file corresponds to the snippet shown in FIG. 3A. It contains the rules for laying out the XML. In our case it specifies that "Parent" elements can exist in 0 to unlimited numbers. They can have 0 to unlimited "Child" elements. Both those elements are allowed a "name" field. The child element is also allowed a "value" field (this is the field that is always contains the word "Data" in FIG. 3A). The XSD is searched for all "xs:element" blocks. These are the same as the "Output Blocks" shown in FIGS. 4 and 5. All elements in the XML file that are children are removed from the XML file and placed in their own blocks. The XML fragmenting mechanism 124 will take each "element" mentioned in the XSD and generate a binary storage block that can contain the same data as the XSD element.

XML standards lay out rules for identifying elements in the XML file based on file syntax. The syntax of the XML standard uses the symbols "<" and "/>" to define elements of the XML file as can be observed in FIG. 3A. In this document these elements are referred to as "parent" and "child blocks" based on their position in the hierarchy of the XML file. The fragmenting mechanism follows the standard XML parsing rules when processing the input XML file to produce output data blocks comprising the parent and child elements as described further below.

Figure 4:
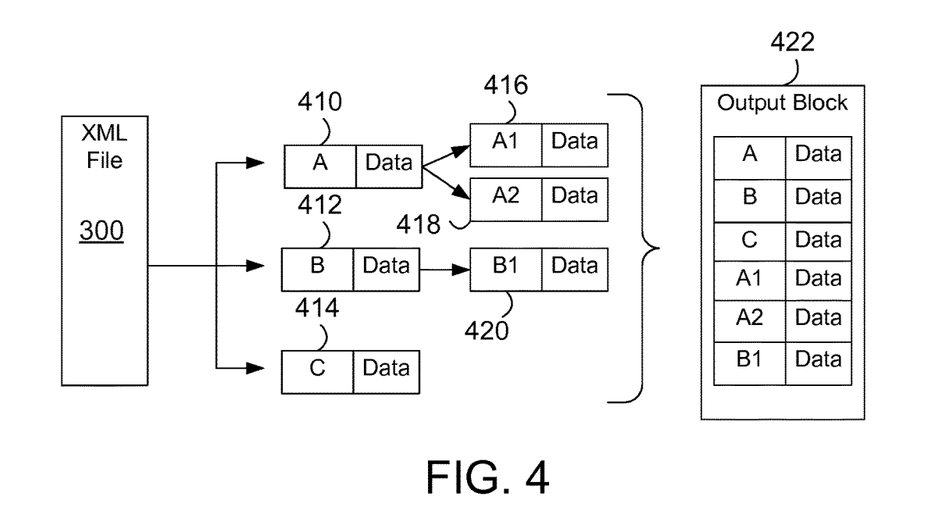
FIG. 4 illustrates a block diagram of to show an example of fragmenting the XML file shown in FIG. 3A.

FIG. 4 illustrates an example of fragmenting the simplified XML file 300 shown in FIG. 3 for storage. The XML fragmenting mechanism uses the XML schema 314 to identify the parent blocks A 410, B 412 and C 414. These parent blocks have associated child blocks 416, 418 and 420 as described above. The XML fragmenting mechanism identifies the parent and child blocks with the hierarchy from the XML schema. The hierarchy of the data as fragmented by the XML fragmenting mechanism is shown by the arrows in FIG. 4. The data blocks thus identified may then be assembled in an output block 422. The output block is temporary data structure to hold the data so that it can be placed into the cluster coordination service. The data blocks in the output block 422 are ordered so that they can be readily stored to the cluster coordination service. In the illustrated example, the parent blocks are listed in hierarchal order followed by the child blocks. Alternatively the output block 422 could merely represent a logically structure where the data blocks are stored to the cluster coordination service as they are identified. The XML fragmenting mechanism then generates mapping rules using the hierarchy of the data structure. The mapping rules describe the relationship between the XML data and the file map and are used to place the data blocks in the data storage service as described below.

Again referring to FIG. 4, each of the data blocks 410, 412, 414, 416, 418 and 420 described above have a name and a data portion. For example, data block 420 has a name "B1" and a data portion or "Data" 422. The data portion 422 of data block 420 contains the portion of the XML file shown in FIG. 3A as child "1" under parent "B". The data of each of the data blocks is preferably stored in binary writable format to reduce the storage space needed for storage but could also be stored in the normal XML text format.

Figure 5:
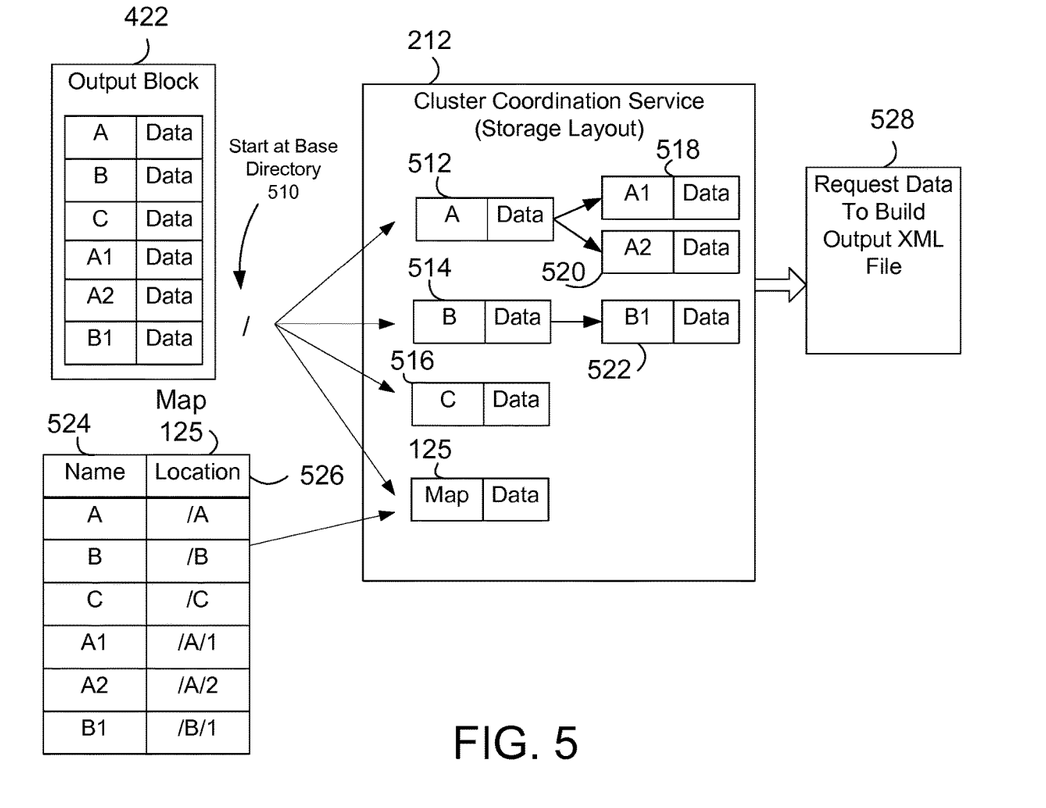
FIG. 5 illustrates a block diagram of an example of storing the fragmented XML file shown in FIG. 3A.

FIG. 5 illustrates an example of storing the fragmented XML file in the output block 422 produced as described above with reference to FIG. 4. In this example, the fragmented XML file in the output block 422 is stored in a cluster coordination service 212. Also in this example, the data blocks are stored using the native file system of the cluster coordination service 212 to achieve the hierarchal structure. Thus the XML fragmenting mechanism instructs the cluster coordination service to place each of the data blocks A 512, B 514, and C 516 at the base directory indicated by the backslash character "/". (Correct?) These data block 512, 514, 516 correspond to the parent elements in the XML file 300 shown in FIG. 3. The child data blocks in the output block 422 are also stored in the cluster coordination service 212. Each child block is placed in a sub-directory of the corresponding parent block. Thus child blocks "A1" 518 and "A2" 520 are placed in the folder or sub-directory "/A". Similarly, child block "B1" 522 is placed in the folder or sub-directory "/B". The XML fragmenting mechanism preferably validates the parent and child data blocks to insure they conform to XML rules prior to storing the blocks in the cluster coordination service.

FIG. 5 further illustrates an XML file map 125 for the example fragmented XML file shown in FIG. 3. As the XML fragmenting mechanism places each of the data blocks into the cluster coordination service 212, the XML fragmenting mechanism creates the XML file map 125 to record the locations of the data blocks. In the illustrated example, the XML file map 125 is a table with a name column 524 for storing name of a data block and a location column 526 for storing the location in the storage system of the corresponding data block in the name column. In this example, the name column has the names of the parent blocks and child blocks from the output block 422. The location column 526 has a location for each block. The XML file map 125 may also be stored in the cluster coordination service 212 as shown at the location "/map". The XML fragmenting mechanism uses the XML file map 125 to retrieve one or more data blocks from the cluster coordination service 212 to create an output XML file 528. Thus the output XML file 528 can reflect the entire original XML file shown in FIG. 3 or a subset of that XML file. A subset of the file can be created. The subset of the file may represent the smallest portion of the XML file that can be made to pass validation while containing the desired portion of the XML file that is being requested from the XML fragmenting mechanism.

Figure 6:
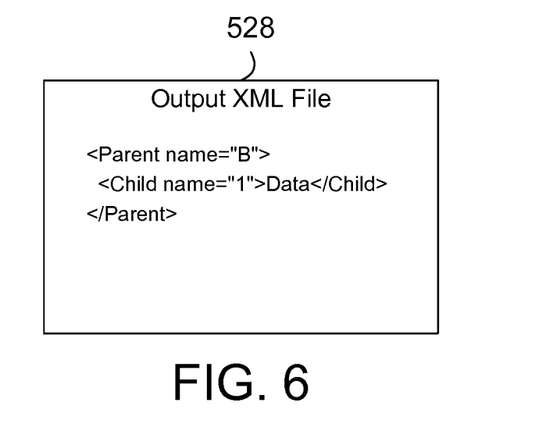
FIG. 6 illustrates an example of a file map for the example XML file shown in FIG. 3A.

FIG. 6 illustrates an example of an output XML file 528 for the example described in FIGS. 3-6. In this example, it is assumed that a client or other software entity has requested the data contained in child "B1" in the original XML file 300 (FIG. 3A). Rather than retrieving and rebuilding the entire XML file 300, the XML fragmenting mechanism retrieves the B1 data and any other data needed to create a valid XML file such as any required parental data members and their associated XML tags. In this example, the XML fragmenting mechanism also retrieves the parent element "B" to create the valid XML file 528 shown in FIG. 6.

Figure 7:
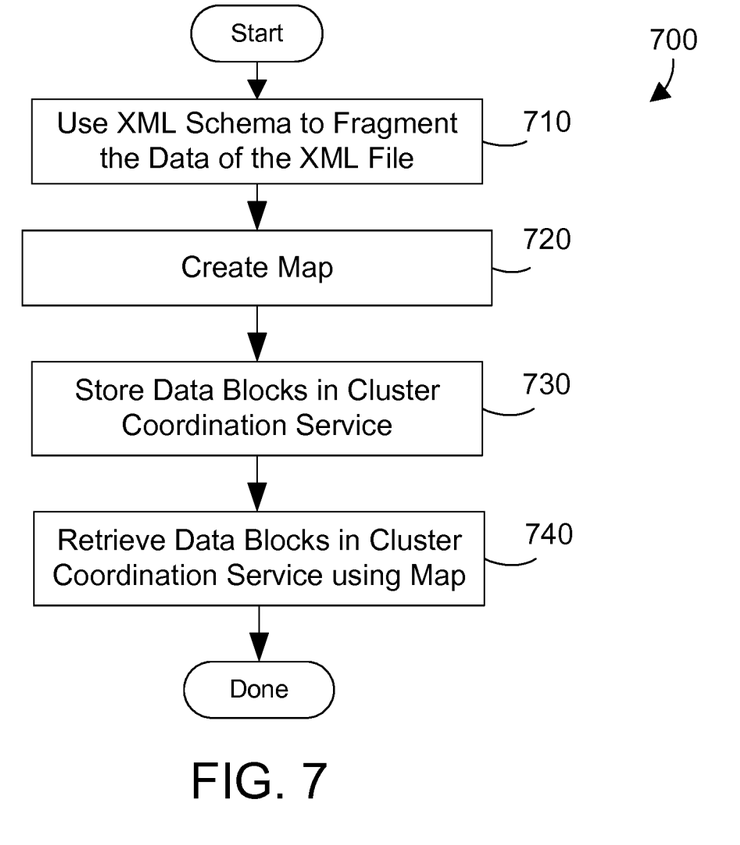
FIG. 7 is a flow diagram of a method for intelligent fragmenting of an XML file as described herein.

Referring now to FIG. 7, a flow diagram shows a method 700 for intelligent fragmenting of an XML file. The steps of method 700 are preferably performed by the XML fragmenting mechanism 124 as described above. First use an XML schema for an XML file to fragment the data of the XML file (step 710). Create a map for storing the data (step 720). Next, store the data blocks using the map in a storage system with a limited block size such as a cluster coordination service and store the map in the cluster coordination service (step 730). Retrieve the data using the map (step 740). The method 700 is then done.

Figure 8:
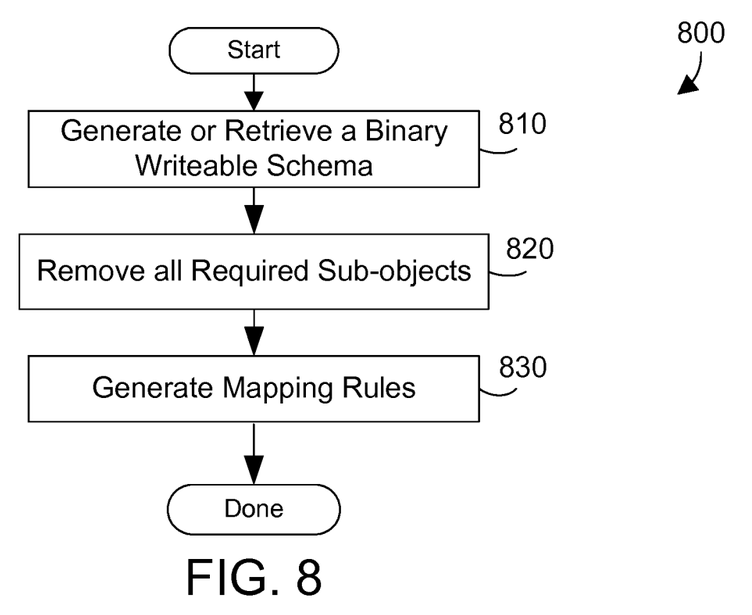
FIG. 8 is a flow diagram of an example method for performing step 710 in FIG. 7.

Referring now to FIG. 8, a flow diagram shows a method 800 that illustrates an example method for step 710 in method 700 shown in FIG. 7. The steps of method 800 are preferably performed by the XML fragmenting mechanism 124 as described above. First generate or retrieve a binary writable schema (step 810). Next, remove all required sub-objects from the XML file (step 820). Generate mapping rules (step 830). The method 800 is then done.

Figure 9:
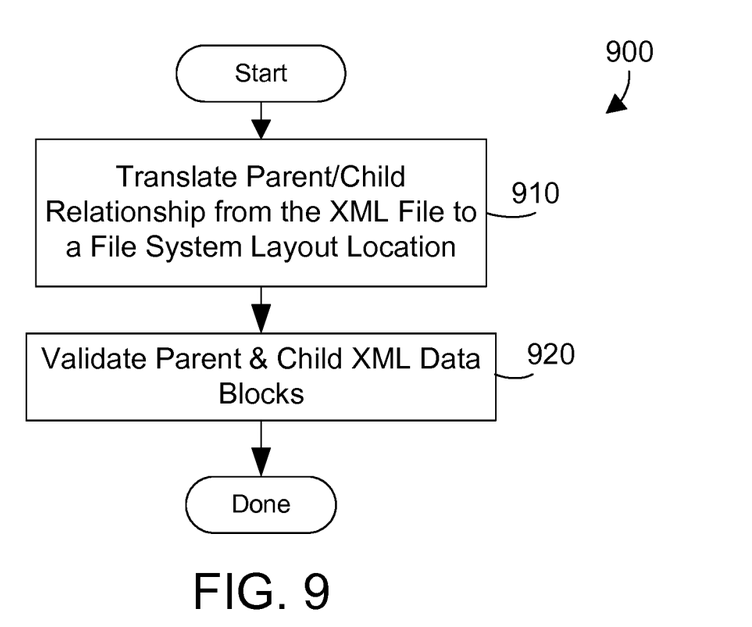
FIG. 9 is a flow diagram of an example method for performing step 720 in FIG. 7.

Referring now to FIG. 9, a flow diagram shows a method 900 that illustrates an example method for step 720 in method 700 shown in FIG. 7. The steps of method 900 are preferably performed by the XML fragmenting mechanism 124 as described above. First, translate parent/child relationships from an XML file to a file system layout to determine a location for data blocks of the XML file (step 910). Next, validate parent/child XML data blocks (step 920). The method 900 is then done.

Figure 10:
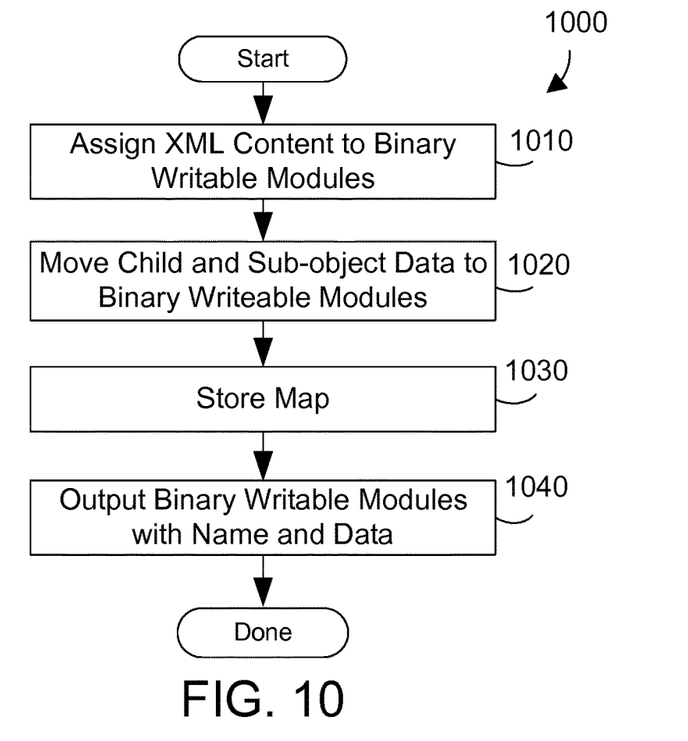
FIG. 10 is a flow diagram of an example method for performing step 730 in FIG. 7.

Referring now to FIG. 10, a flow diagram shows a method 1000 that illustrates an example method for step 730 in method 700 shown in FIG. 7. The steps of method 1000 are preferably performed by the XML fragmenting mechanism 124 as described above. First, assign XML content to binary writable modules (step 1010). Move child and sub-objects data to binary writable blocks (step 1020). Store the map (for example, write the map to the cluster coordination service) (step 1030). Then output the binary writable blocks having a name and data portion for storage (step 1040). The method 1000 is then done.

Figure 11:
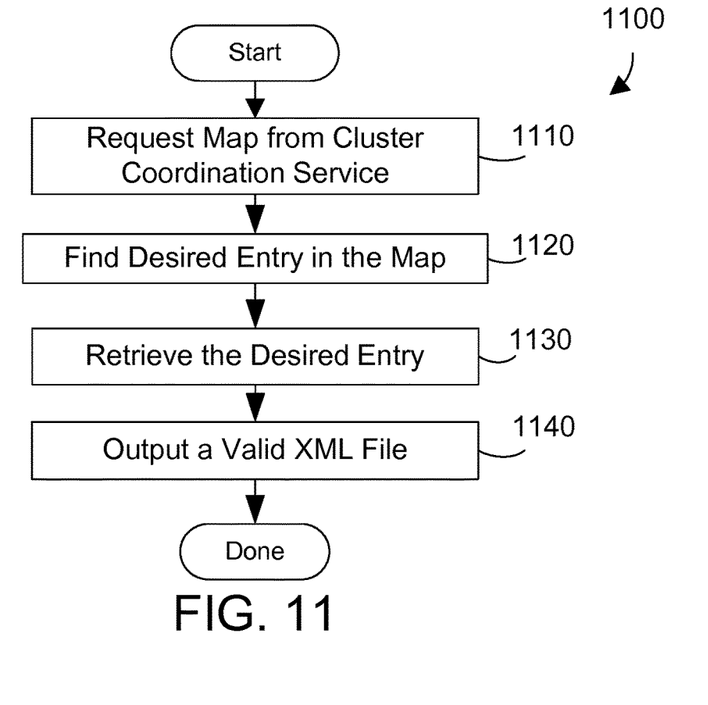
FIG. 11 is a flow diagram of an example method for performing step 740 in FIG. 7.

Referring now to FIG. 11, a flow diagram shows a method 1100 that illustrates an example method for step 740 in method 700 shown in FIG. 7. The steps of method 1100 are preferably performed by the XML fragmenting mechanism 124 as described above. First, request a map from the cluster coordination service (step 1110). Next, find the desired entry in the map (step 1120). Retrieve data blocks for the desired entry from the cluster coordination service using the location data from the map (step 1130). Output a valid XML file with all or a sub-set of the data of the original XML file using the retrieved data blocks (step 1140). The method 1100 is then done.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosure and claims are directed to an apparatus and method for an XML fragmenting mechanism. The XML fragmenting mechanism uses an XML schema for the XML file to split up the XML file in a hierarchal structure of data blocks for storage in a storage system that has a limited data block size. The XML fragmenting mechanism supports efficient retrieval of all or part of the data in a valid XML file.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   an extensible markup language (XML) file with a parent element and a child element corresponding to the parent element;
   an XML schema corresponding to the XML file;
   an XML fragmenting mechanism residing in the memory and executed by the at least one processor that intelligently splits the XML file based on the XML schema into a plurality of data blocks that have a pre-determined maximum size, wherein the XML fragmenting mechanism stores the plurality of data blocks into a data storage system in a hierarchal structure according to relationships from the XML file schema between the parent element and the child element by placing a first data block corresponding to the parent element of the XML file in a first location of the hierarchal structure and a second data block corresponding to the child element of the XML file in a second location of the hierarchal structure;
   wherein the XML fragmenting mechanism stores the first data block corresponding to the parent element in a base directory and stores the second data block corresponding to the child element in a sub-directory under the base directory; and
   wherein the XML fragmenting mechanism retrieves data blocks from the data storage system and builds a valid output XML file from a subset that is a smallest portion of the XML file that passes validation which contains a desired portion of the XML file that is requested from the XML fragmenting mechanism.

2. The apparatus of claim 1 wherein the XML fragmenting mechanism creates an XML map that indicates the storage location of the first and second data blocks in data storage system.

3. The apparatus of claim 2 wherein the XML map is stored in the data storage system.

4. The apparatus of claim 1 wherein the data storage system is a cluster coordination service.

5. An apparatus comprising:
   at least one processor;
   a memory coupled to the at least one processor;
   an extensible markup language (XML) file with a parent element and a child element corresponding to the parent element;
   an XML schema corresponding to the XML file;
   an XML fragmenting mechanism residing in the memory and executed by the at least one processor that splits the XML file based on the XML schema into a plurality of data blocks that have a pre-determined maximum size, wherein the XML fragmenting mechanism creates an XML map that indicates storage locations of the plurality of data blocks in a hierarchal structure in a cluster coordination service, and stores the plurality of data blocks in the cluster coordination service by placing a first data block corresponding to a parent element in a base directory and a second data block corresponding to a child element in a sub-directory under the base directory;

and wherein the XML fragmenting mechanism retrieves data blocks from the data storage system and builds a valid output XML file from a subset of the XML file that is a smallest portion of the XML file that passes validation which contains a desired portion of the XML file that is requested from the XML fragmenting mechanism.

6. An apparatus comprising:

at least one processor;

a memory coupled to the at least one processor;

an extensible markup language (XML) file with a parent element and a child element corresponding to the parent element;

an XML schema corresponding to the XML file; and an XML fragmenting mechanism residing in the memory and executed by the at least one processor that intelligently splits the XML file based on the XML schema into a plurality of data blocks that have a pre-determined maximum size, wherein the XML fragmenting mechanism stores the plurality of data blocks into a data storage system in a hierarchal structure according to relationships from the XML file schema between the parent element and the child element by placing a first data block corresponding to the parent element of the XML file in a first location of the hierarchal structure and a second data block corresponding to the child element of the XML file in a second location of the hierarchal structure;

wherein the XML fragmenting mechanism stores the first data block corresponding to the parent element in a base directory and stores the second data block corresponding to the child element in a sub-directory under the base directory;

wherein the XML fragmenting mechanism retrieves data blocks from the data storage system and builds a valid output XML file from a subset that is a smallest portion of the XML file that passes validation which contains a desired portion of the XML file that is requested from the XML fragmenting mechanism; and wherein the parent element and the child element are converted to a binary writable format and stored in the first and second data blocks.

7. The apparatus of claim 6 wherein the XML fragmenting mechanism creates an XML map that indicates the storage location of the first and second data blocks in data storage system.

8. The apparatus of claim 7 wherein the XML map is stored in the data storage system.

9. The apparatus of claim 6 wherein the data storage system is a cluster coordination service.

\* \* \* \* \*